(12) United States Patent
Ray et al.

(10) Patent No.: US 8,548,421 B2
(45) Date of Patent: Oct. 1, 2013

(54) BATTERY CHARGE RESERVATION FOR EMERGENCY COMMUNICATIONS

(75) Inventors: Amar Nath Ray, Shawnee, KS (US); Carl M. Coppage, Kansas City, MO (US); Lynne T. Greene, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 528 days.

(21) Appl. No.: 12/257,655

(22) Filed: Oct. 24, 2008

(65) Prior Publication Data

US 2010/0003950 A1    Jan. 7, 2010

Related U.S. Application Data

(60) Provisional application No. 61/078,123, filed on Jul. 3, 2008.

(51) Int. Cl.
*H04M 11/04* (2006.01)
*H04M 1/00* (2006.01)

(52) U.S. Cl.
USPC .................. 455/404.1; 455/572; 455/574

(58) Field of Classification Search
USPC ............................................ 455/404.1
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,710,803 A | 1/1998 | Kowal et al. |
| 5,936,622 A * | 8/1999 | Halverson et al. ............ 715/771 |
| 5,941,930 A | 8/1999 | Morimoto et al. |
| 6,240,285 B1 | 5/2001 | Blum et al. |
| 6,317,049 B1 * | 11/2001 | Toubia et al. ............... 340/573.4 |
| 6,366,772 B1 | 4/2002 | Arnson |
| 6,377,169 B1 | 4/2002 | Yanagisawa |
| 6,405,033 B1 | 6/2002 | Kennedy et al. |
| 6,415,018 B1 | 7/2002 | Antonucci et al. |
| 6,424,908 B2 | 7/2002 | Urban et al. |
| 6,456,695 B2 | 9/2002 | Lee |
| 6,480,578 B1 | 11/2002 | Allport |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Lester Kincaid
*Assistant Examiner* — Andy Gu
(74) *Attorney, Agent, or Firm* — Swanson & Bratschun, L.L.C.

(57) ABSTRACT

A wireless communications device and method for establishing a voltage threshold at which to turn off electronics of a wireless communications device includes determining a power threshold level at which a device is to be shut off when a battery of the device reaches or drops below the power threshold level. The determined power threshold level may be offset. The amount of power remaining for the battery in the communications device may be measured. The communication device may be shut off based on the offset power threshold level so as to preserve enough power for an emergency message to be generated and sent in the case of an emergency.

12 Claims, 7 Drawing Sheets

(56) References Cited

U.S. PATENT DOCUMENTS

| | | |
|---|---|---|
| 6,526,125 B1 | 2/2003 | Lindsay et al. |
| 6,631,184 B1 | 10/2003 | Weiner |
| 6,636,732 B1 | 10/2003 | Boling et al. |
| 6,690,932 B1 | 2/2004 | Barnier et al. |
| 7,026,925 B2 | 4/2006 | Roche et al. |
| 7,079,627 B2 | 7/2006 | Crago et al. |
| 7,095,733 B1 | 8/2006 | Yarlagadda et al. |
| 7,231,218 B2 | 6/2007 | Diacakis et al. |
| 7,269,413 B2 | 9/2007 | Kraft |
| 7,391,784 B1 | 6/2008 | Renkel |
| 7,418,087 B2 | 8/2008 | Luneau et al. |
| 7,444,238 B1 | 10/2008 | Opitz |
| 7,496,189 B2 | 2/2009 | Clarisse et al. |
| 7,679,505 B1 | 3/2010 | Vallaire |
| 7,706,356 B1 | 4/2010 | Olshansky et al. |
| 7,734,019 B1 | 6/2010 | Terpstra |
| 8,364,117 B2 | 1/2013 | Hawkins |
| 8,428,548 B2 | 4/2013 | Ray et al. |
| 8,472,916 B2 | 6/2013 | Coppage et al. |
| 8,489,062 B2 | 7/2013 | Ray et al. |
| 2001/0003843 A1 | 6/2001 | Scepanovic et al. |
| 2001/0004588 A1* | 6/2001 | Hong .................. 455/404 |
| 2001/0012379 A1 | 8/2001 | Amemiya et al. |
| 2002/0016189 A1* | 2/2002 | Sheynblat et al. ............ 455/574 |
| 2002/0068584 A1 | 6/2002 | Gage et al. |
| 2002/0136363 A1 | 9/2002 | Stumer et al. |
| 2003/0063714 A1 | 4/2003 | Stumer et al. |
| 2003/0109245 A1 | 6/2003 | McCalmont et al. |
| 2003/0122779 A1 | 7/2003 | Martin et al. |
| 2003/0133450 A1 | 7/2003 | Baum |
| 2003/0162554 A1 | 8/2003 | Kim |
| 2004/0029610 A1 | 2/2004 | Ihira et al. |
| 2004/0056770 A1 | 3/2004 | Metcalf, Jr. |
| 2004/0063439 A1 | 4/2004 | Glazko et al. |
| 2004/0072583 A1* | 4/2004 | Weng .................... 455/456.3 |
| 2004/0113836 A1 | 6/2004 | Rickerson, Jr. |
| 2004/0157564 A1 | 8/2004 | Murakami et al. |
| 2004/0176123 A1 | 9/2004 | Chin et al. |
| 2004/0185871 A1 | 9/2004 | Somani et al. |
| 2004/0198329 A1 | 10/2004 | Vasa |
| 2004/0258216 A1 | 12/2004 | Reid |
| 2005/0003797 A1 | 1/2005 | Baldwin |
| 2005/0048947 A1 | 3/2005 | Holland et al. |
| 2005/0070315 A1 | 3/2005 | Rai et al. |
| 2005/0085257 A1 | 4/2005 | Laird et al. |
| 2005/0097380 A1 | 5/2005 | Kim |
| 2005/0101287 A1* | 5/2005 | Jin et al. .................... 455/404.1 |
| 2005/0111630 A1 | 5/2005 | Potorny et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0239477 A1 | 10/2005 | Kim et al. |
| 2005/0265326 A1 | 12/2005 | Laliberte |
| 2005/0277405 A1 | 12/2005 | Noguchi |
| 2006/0009243 A1 | 1/2006 | Dahan et al. |
| 2006/0052134 A1* | 3/2006 | Sato ..................... 455/556.1 |
| 2006/0056620 A1 | 3/2006 | Shingal et al. |
| 2006/0133582 A1 | 6/2006 | McCulloch |
| 2006/0145841 A1 | 7/2006 | Daurensan et al. |
| 2006/0152373 A1 | 7/2006 | King |
| 2006/0166685 A1 | 7/2006 | Adkins |
| 2006/0217105 A1 | 9/2006 | Kumar P S et al. |
| 2006/0217136 A1 | 9/2006 | Bantukul et al. |
| 2006/0219542 A1* | 10/2006 | Savir ..................... 200/314 |
| 2006/0222151 A1 | 10/2006 | Goldman et al. |
| 2006/0227122 A1* | 10/2006 | Proctor .................. 345/204 |
| 2006/0229100 A1 | 10/2006 | Born |
| 2006/0238384 A1 | 10/2006 | Hess et al. |
| 2006/0276168 A1 | 12/2006 | Fuller et al. |
| 2006/0293024 A1 | 12/2006 | Benco et al. |
| 2007/0001902 A1 | 1/2007 | Kuo et al. |
| 2007/0003024 A1 | 1/2007 | Olivier et al. |
| 2007/0082652 A1 | 4/2007 | Hartigan et al. |
| 2007/0201391 A1 | 8/2007 | Belmonte et al. |
| 2007/0201645 A1 | 8/2007 | Gass et al. |
| 2007/0273519 A1 | 11/2007 | Ichikawa et al. |
| 2007/0280428 A1 | 12/2007 | McClelland |
| 2007/0287473 A1 | 12/2007 | Dupray |
| 2008/0001734 A1 | 1/2008 | Stilp et al. |
| 2008/0013696 A1 | 1/2008 | Motley et al. |
| 2008/0057944 A1 | 3/2008 | Miriyala et al. |
| 2008/0057987 A1 | 3/2008 | Landschaft et al. |
| 2008/0070553 A1 | 3/2008 | Yamakawa et al. |
| 2008/0122929 A1 | 5/2008 | Chukwu |
| 2008/0220715 A1 | 9/2008 | Sinha et al. |
| 2008/0227427 A1 | 9/2008 | Kadavallur et al. |
| 2008/0254810 A1 | 10/2008 | Fok et al. |
| 2008/0273670 A1 | 11/2008 | Dickinson |
| 2008/0275950 A1 | 11/2008 | Jordan |
| 2008/0287748 A1 | 11/2008 | Sapounas et al. |
| 2008/0310850 A1 | 12/2008 | Pederson et al. |
| 2009/0047924 A1 | 2/2009 | Ray et al. |
| 2009/0064039 A1 | 3/2009 | Lee et al. |
| 2009/0121930 A1 | 5/2009 | Bennett et al. |
| 2009/0131072 A1 | 5/2009 | Razdan et al. |
| 2009/0144157 A1 | 6/2009 | Saracino et al. |
| 2009/0149153 A1 | 6/2009 | Lee |
| 2009/0186596 A1 | 7/2009 | Kaltsukis |
| 2009/0197567 A1 | 8/2009 | Ogram |
| 2009/0215428 A1 | 8/2009 | Noldus et al. |
| 2009/0227225 A1 | 9/2009 | Mitchell et al. |
| 2009/0233573 A1 | 9/2009 | Gray |
| 2009/0310602 A1 | 12/2009 | Olshansky et al. |
| 2010/0098062 A1 | 4/2010 | Croak et al. |
| 2010/0291894 A1 | 11/2010 | Pipes |
| 2013/0115909 A1 | 5/2013 | Hawkins |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pp./products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Mar. 17, 2011 for U.S. Appl. No. 12/257,640.

Non-Final Rejection mailed Mar. 3, 2011 for U.S. Appl. No. 12/257,416.

U.S. Appl. No. 12/257,674; Notice of Allowance dated Jan. 25, 2012; 7 pages.

U.S. Appl. No. 12/257,674; Final Rejection dated Oct. 3, 2011; 15 pages.

U.S. Appl. No. 12/257,674 Non-Final Rejection dated Apr. 28, 2011; 14 pages.
U.S. Appl. No. 12/257,717; Final Rejection dated Jan. 23, 2012; 16 pages.
U.S. Appl. No. 12/257,717; Non-Final Rejection dated Sep. 13, 2011; 14 pages.
U.S. Appl. No. 12/257,736; Non-Final Rejection dated Apr. 28, 2011; 15 pages.
U.S. Appl. No. 12/257,736; Final Rejection dated Nov. 23, 2011; 17 pages.
U.S. Appl. No. 12/257,736; Amendment and Request for Continued Examination dated Feb. 22, 2012; 12 pages.
U.S. Appl. No. 12/257,725; Final Rejection dated Jan. 17, 2012; 17 pages.
U.S. Appl. No. 12/257,725; Non-Final Rejection dated Jul. 19, 2011; 26 pages.
U.S. Appl. No. 12/257,640; Non-Final Rejection dated Jan. 4, 2012; 19 pages.
U.S. Appl. No. 12/257,640; Final Rejection dated Aug. 17, 2011; 11 pages.
U.S. Appl. No. 12/070,775; Non-Final Rejection dated Jul. 25, 2011; 33 pages.
U.S. Appl. No. 12/257,836 Non-Final Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,687; Non-Final Rejection dated May 10, 2011; 14 pages.
U.S. Appl. No. 12/257,687; Final Rejection dated Sep. 29, 2011; 12 pages.
U.S. Appl. No. 12/257,416; Final Rejection dated Jul. 14, 2011; 17 pages.
U.S. Appl. No. 12/070,775; Notice of Allowance dated Sep. 12, 2012; 24 pages.
U.S. Appl. No. 12/257,674; Final Rejection dated Nov. 5, 2012; 17 pages.
U.S. Appl. No. 12/257,687; Final Rejection dated Aug. 31, 2012; 19 pages.
U.S. Appl. No. 12/257.717; Non-Final Rejection dated Aug. 16, 2012; 42 pages.
U.S. Appl. No. 12/257,836; Non-Final Rejection dated Sep. 12, 2012; 25 pages.
U.S. Appl. No. 12/070,775; Final Rejection dated May 14, 2012; 27 pages.
U.S. Appl. No. 12/257,674; Non-Final Rejection dated Jul. 20, 2012; 21 pages.
U.S. Appl. No. 12/257,640; Final Rejection dated May 2, 2012; 18 pages.
U.S. Appl. No. 12/257,416; Final Rejection dated Jun. 13, 2012; 38 pages.
U.S. Appl. No. 12/257,836; Final Rejection dated May 14, 2012; 26 pages.
U.S. Appl. No. 12/070,775; Issue Notification dated Jan. 9, 2013; 1 page.
U.S. Appl. No. 12/257,640; Non-Final Rejection dated Dec. 5, 2012; 23 pages.
U.S. Appl. No. 12/257,725; Notice of Allowance dated Dec. 24, 2012; 24 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,717; Notice of Allowance dated Feb. 14, 2013; 35 pages.
U.S. Appl. No. 12/257,836; Issue Notification dated Jun. 26, 2013; 1 page.
U.S. Appl. No. 12/257,836; Notice of Allowance dated Mar. 12, 2013; 31 pages.
U.S. Appl. No. 13/712,669; Non-Final Rejection dated Mar. 27, 2013; 34 pages.
U.S. Appl. No. 12/257,674; Notice of Allowance dated Apr. 3, 2013; 15 pages.
U.S. Appl. No. 12/257,725; Issue Notification dated Apr. 3, 2013; 1 page.
U.S. Appl. No. 12/957,640; Final Rejection dated Apr. 15, 2013 ; 21 pages.
U.S. Appl. No. 12/257,416; Non Final Office Action dated May 22, 2013; 40 pages.
U.S. Appl. No. 12/257,687; Issue Notification dated Jun. 5, 2013; 1 page.

* cited by examiner

BATTERY CHARGE RESERVATION FOR EMERGENCY COMMUNICATIONS

PRIORITY

This Application claims priority to Provisional Patent Application Ser. No. 61/078,123, entitled: Emergency 911 Text Messaging Services, was filed on Jul. 3, 2008; the entire teachings of which are incorporated herein by reference.

BACKGROUND OF THE INVENTION

Wireless communications devices, such as cellular phones, pagers, PDAs, and many other similar devices are prolific in modern society. One commonality among most of the devices is the use of batteries to power the devices. Batteries, by their very nature, discharge with use and at some point the battery does not contain sufficient charge to power the device. Currently, there are ways to determine battery life remaining for a device. Additionally, the devices often include a display showing the amount of time or a percentage of the charge of the battery remaining.

Users often ignore warnings indicating that there is low power remaining until a device ceases to work. If the user has no alternative way to power the device until the battery gets replaced or recharged, the device becomes useless. In the event of an emergency or otherwise, the device will not allow even a brief communication until the battery is replaced or another power source is provided.

BRIEF SUMMARY OF THE INVENTION

In order to provide an emergency power supply to a wireless communications device, a secondary battery may be provided for operating emergency functions of a wireless communications device. In the case where only a single battery is present, a voltage threshold may be deterrmned and utilized to implement a battery cut off, thereby providing reserve backup power for use in emergency situations or upon being overridden by a user.

One embodiment includes a wireless communications device including electronics configured to provide communications over a communications network, a primary battery configured to power the electronics during a power-on mode, and a secondary battery configured to power the electronics in response to an emergency signal being received while the electronics are in a power-off mode.

Another embodiment of a method for establishing a voltage threshold at which to turn off electronics of a wireless communications device includes determining a power threshold level at which a device is to be shut off when a battery of the device reaches or drops below the power threshold level. The determined power threshold level may be offset. The amount of power remaining for the battery in the communications device may be measured. The wireless communications device may be shut off based on the offset power threshold level.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
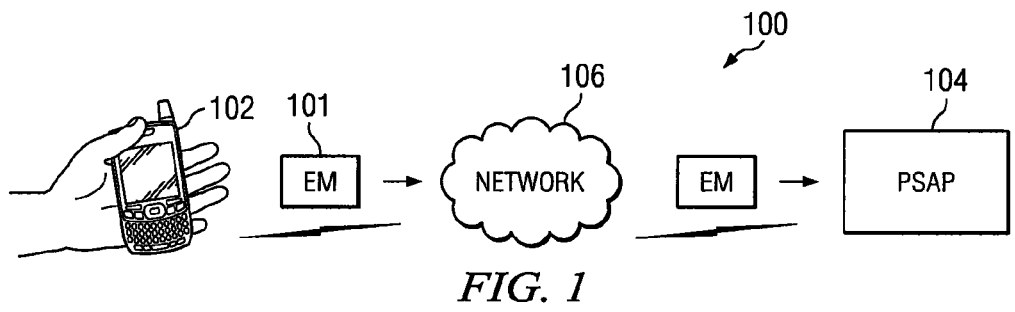
FIG. 1 is an embodiment of an illustrative environment for communicating an emergency message to a Public Safety Answering Point.

FIG. 1 is an embodiment of an environment 100 for communicating an emergency message 101 from a wireless communications device 102 to a Public Safety Answering Point (PSAP) 104. The wireless communications device 102 may be mobile telephones, pager, personal digital assistants (PDAs), wireless electronic games, multi-mode telephones, or other electronic devices capable of communicating emergency data messages (EDMs) to PSAPs over a communications network 106. The emergency data message or emergency message 101 may include an SMS or text message, instant messages (IMs), e-mail, photo messages, video messages, voice message or any other format the PSAP 104 is configured to receive and the communications network 106 is configured to communicate. The communications network 106 may be a cellular network, the public switched telephone network (PSTN), the Internet, or any communications network configured to communicate with the PSAP 104.

As not all wireless communications devices are configured to generate preformatted emergency data messages, a user may generate and communicate a freeform emergency data message (e.g., text message, e-mail, instant message, image message) to a network address, such as Internet domain name "911.911," for routing to a PSAP local to the user. A freeform emergency data message is any data message that is addressed and communicated to a network address for routing to a PSAP local to the user.

There are different configurations of PSAPs 104, where different PSAPs have different capabilities. Some PSAPs 104 ate compatible with E911 Phase I, while others are compatible with E911 Phase II, as is commonly known in the art. For less advanced PSAPs 104, only basic information, such as the telephone number of the caller and a name registered may be communicated. More advanced PSAPs 104 include much greater detail, where some are capable of determining coordinates and physical addresses of mobile phone users.

Figure 2A:
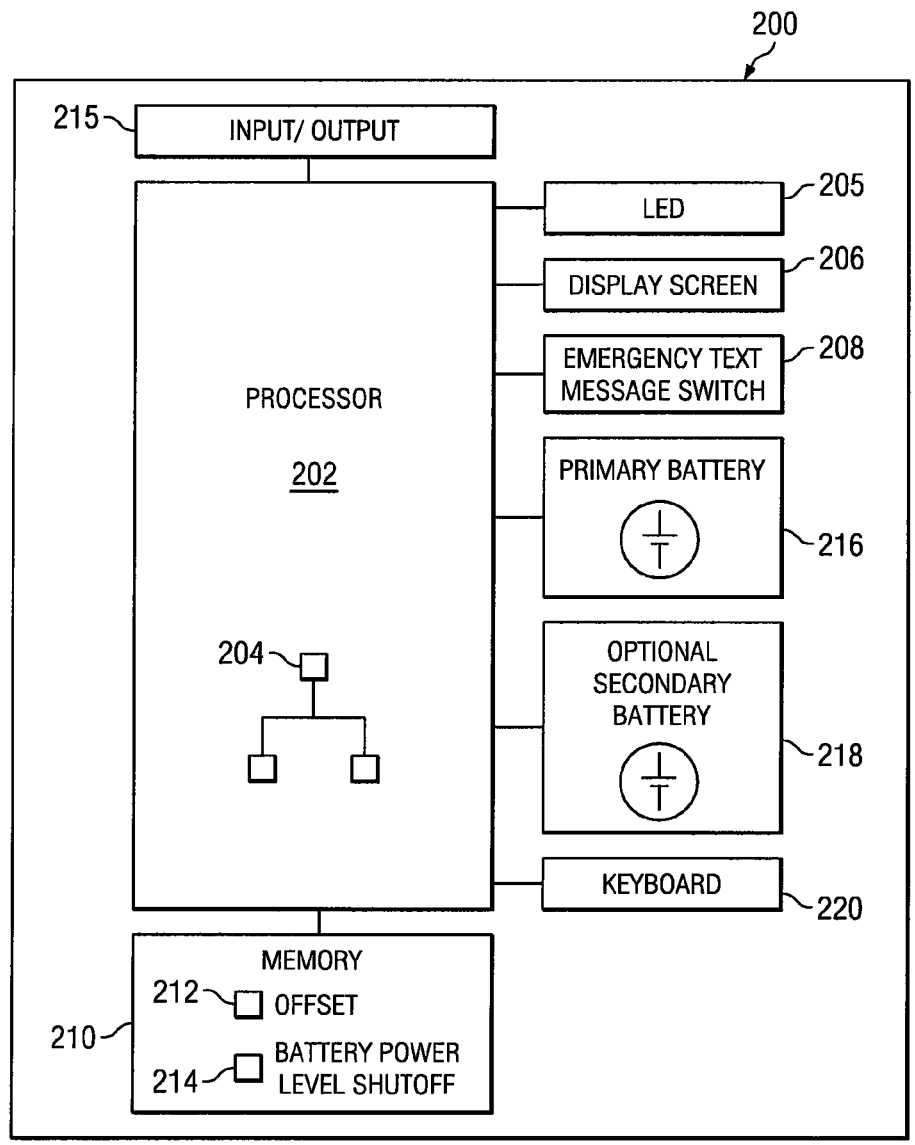
FIG. 2A is a block diagram of illustrative components of a wireless communications device configured to communicate an emergency message.

FIG. 2A is a block diagram of components 200 of a wireless communications device 102 of FIG. 1 configured to communicate an emergency message. The wireless communications device 102 may include a processor 202 for processing the emergency message. The processor 202 may execute software 204 capable of performing the functionality of the wireless communications device 102. Software modules that operate in the software 204 are described below in more detail in reference to FIG. 2B. A light emitting diode (LED) 205 may be provided for indicating power status of the wireless communications device. Alternatively or additionally, a power status indicator may be displayed on a display screen 206. The display screen 206 may further display a number being dialed, text being sent, and any other information as is customary on a wireless communications device. The full display screen 206 may be powered at any given time or one or more portions of the display screen 206 may be powered independently from the rest of the screen. Configuring a portion of the display screen 206 to be powered independently from the rest of the display screen 206 allows for reduced battery consumption by powering a reduced portion of the screen, as well as the ability for a small part of the display screen to remain operable for initiating emergency functions.

An emergency text messaging switch 208 may be provided for initiating an emergency message from the wireless communications device 102. The emergency text messaging switch 208 may be a hard-button, such as a traditional key on a keypad, or may be a soft-button, such as found on a device with a touch screen. When the emergency text messaging switch 208 is depressed or otherwise activated, an emergency text message may be generated and communicated to a PSAP. A more detailed description of the generation and communication is described below in greater detail.

Memory 202 may also be located within the wireless communications device 102 for storing data being processed by the processor 206. The memory 202 may be removable, such as flash memory, or fixedly attached within the wireless communications device 102, such as SDRAM, or any other memory configured to store data within the wireless communications device 102. Within the memory 210 may be an offset 212 representing an amount of power that a user or other entity decides is an appropriate margin above a traditional battery power level shutoff 214. The offset 212 may be an adder (e.g., 3%), a multiplier (e.g., 1.5), or any other value used to modify or adjust an existing voltage, current or battery power level shutoff 214. In an alternative embodiment, a set power level, not specifically tied to the battery power level shutoff 214, may also be used for the offset 212. The battery power level shutoff 214 may be configured to represent the power level at which the power remaining in a battery is not sufficient to power the wireless communications device 102. The battery power level shutoff 214 may be determined based on continuously monitoring the power level or may be determined in advance and preprogrammed into the wireless communications device 102. Once the battery power level shutoff 214 has been set, calculations using the offset 212 and the battery power level shutoff 214 may be made to determine when to power off the wireless communications device 102 in order to reserve enough power in the battery for at least one emergency communication to be communicated. The offset 212 and battery power level shutoff 214 is described below in greater detail in FIG. 3.

An input/output (I/O) unit 215 may be provided for communicating emergency messages as well as providing for the traditional functionalities of the wireless communication device 102, as commonly known in the art. The I/O unit 215 may additionally include a transceiver (not shown) for transmitting an emergency message to a PSAP or remote location and for receiving and sending communications as commonly performed by a wireless communications device 102.

A primary battery 216 may be included to provide power to the wireless communications device 102. In one embodiment, only one battery, the primary battery 216, may be present. If only the primary battery 216 is present, the wireless communications device 102 may be configured to power down according to calculations using the offset and battery power level shutoff in order to reserve power in the event the wireless communications device 102 is needed for one or more emergency messages to be communicated.

In another embodiment, an optional secondary battery 218 may be present to provide power to the wireless communications device 102 during emergency situations in case the primary battery 216 is out of charge. The presence of the optional secondary battery 218 may obviate the use of the offset 212 as described previously. If an optional secondary battery 218 is present, the battery power level shutoff 210 may be the correctional point (i.e., without offset) at which the wireless communications device 102 is configured to shut down. In one embodiment, the secondary battery 218 may be used upon depletion of the primary battery 216 and in response to a request for communicating an emergency message. Alternatively, the secondary battery 218 may be used in any number of other circumstances in which the primary battery 216 is not able to provide power and the device is needed.

Figure 2B:
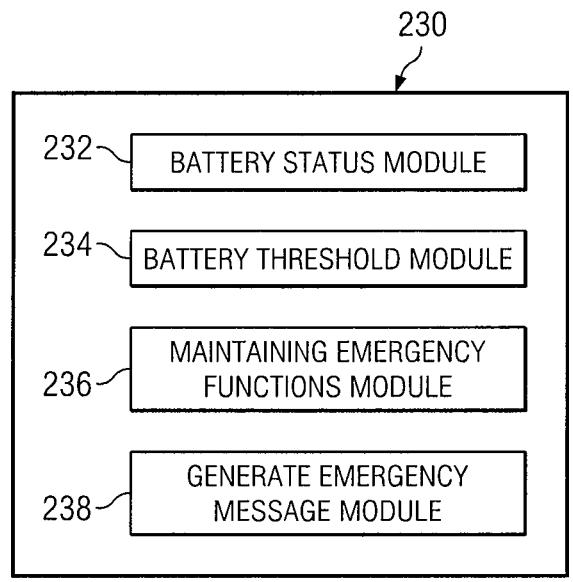
FIG. 2B is a block diagram of illustrative modules used for battery management as well as communication of an emergency message, according to principles of the present invention.

FIG. 2B is a block diagram of modules used for battery management as well as communication of an emergency message, according to principles of the present invention. A battery status module 232 may provide information regarding the amount of power left in one or more batteries. The battery status module may keep track of the current charge remaining, use historical information to determine an estimated amount of time remaining for the device, as well as other functions regarding the status of the battery. A battery threshold module 234 may manage information used to manage the battery and determine a battery power threshold at which to turn off the wireless communications device. The battery threshold module 234 may work in coordination with the battery status module 232 using available data, such as the amount of time a previous battery charge lasted before becoming inoperable, the current remaining charge, current operating time of the battery, and other relevant calculations to determine a shut off time for the wireless communications device.

A maintaining emergency functions module 236 may be configured to provide an emergency reserve of battery power for the wireless communications device 102. Either independently or by using the battery status module 232, as well as the battery threshold module 234, the maintaining emergency functions module 236 may determine how much charge is necessary to provide the wireless communications device 102 with enough power to communicate at least one emergency communications message. Using the determined charge information, the maintaining emergency functions module 236 may attempt to reserve enough battery power for communicating at least one emergency message to a PSAP when the wireless device is configured with a single battery.

Depending upon the status or mode of the device at the time an emergency message request is made, the wireless communications device may operate differently. There are at least two modes for the wireless communications device 102, a power-on mode and a power-off mode. In the power-on mode, the wireless communications device is currently on, and in the power-off mode, the wireless communications device is currently off. While in the power-on mode, when it is determined that the power level has crossed a set power threshold, the maintaining emergency functions module 236 may be configured to automatically place the wireless communications device in power-off mode. Accordingly, the power-off mode may occur either manually, such as when a user chooses to turn off the device, or automatically, such as when the maintaining emergency functions module 236 places the device in power-off mode. In one embodiment, the maintaining emergency functions module 236 may be configured to allow a user to override the power reserve and use the remaining battery life for actions other than emergency communications.

A generate emergency message module 238 may also be present within the wireless communications device 102 for generating and enabling the communication of an emergency message from the wireless communications device. The generate emergency message module 238 may be initiated by a "hard-key" or "hard-button" configured to initiate an emergency message or other emergency signal by the wireless communications device 102. The hard-key may be a dedicated button configured to initiate the emergency communication, or may be a key with multiple functions, where one of the functions initiates the emergency communication. For example, an On/Off button may be configured to (i) power on or off the device, (ii) initiate the generate emergency message module 238 if pressed in a unique pattern or some other variation. In one embodiment, a soft-key, such as an icon on a touch screen enabled device, may also be configured to cause the generate emergency message 238 to generate an emergency message 238 to generate an emergency message.

Figure 2C:
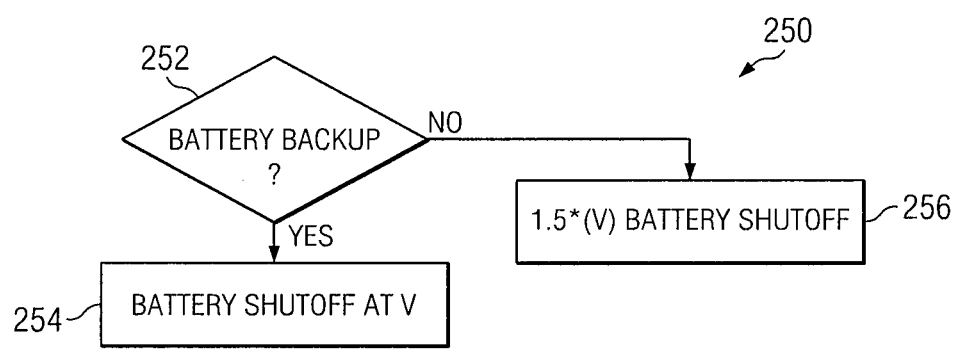
FIG. 2C is a flowchart of an illustrative process for determining battery shutoff timing.

FIG. 2C is a flowchart of a process 250 for determining battery shutoff timing. At step 252, the presence of a battery backup is determined. If there is no battery backup or secondary battery, at step 256, a battery shutoff may occur when the battery is 1.5 times, for example, a power threshold level (V), where the power threshold level may be a predetermined power level at which the battery no longer contains enough power to operate the wireless communications device 102. By using a multiplier, such as 1.5, of the power threshold level, the battery for the wireless communications device 102 will contain enough reserve charge to communicate an emergency communications message, if requested to do so. While 1.5 is used as an example multiplier, any multiplier may be suitable depending on the power that is determined to be necessary to communicate an emergency communications message.

It should be understood that different wireless communications devices may have different power requirements. If there is a backup battery present within the wireless communications device 102, rather than using an offset as in the single battery configuration, the battery may be configured to shutoff at the power threshold level V at step 254. Because of the presence of a backup battery, the entire charge remaining in a primary battery may be used for normal functions of the wireless communications device 102. In the event an emergency communications message becomes necessary to be communicated, the backup battery may be used to power the wireless communications device 102.

Figure 2D:
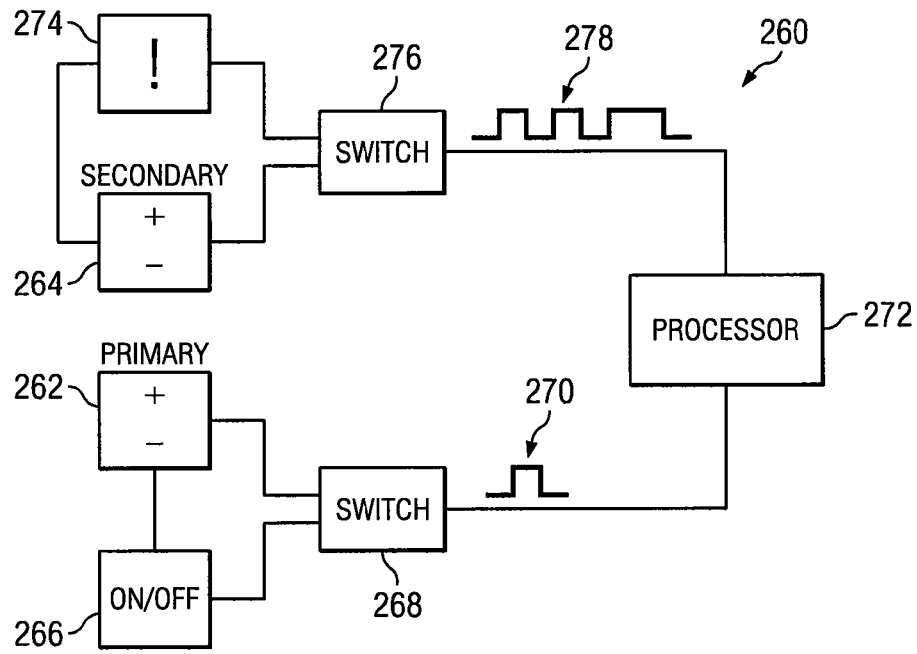
FIG. 2D is a block diagram of illustrative components of a wireless communications device configured to provide reserve power for an emergency communication by using a secondary battery.

FIG. 2D is a block diagram of illustrative components 260 of a wireless communications device configured to provide reserve power for an emergency communication by using a secondary battery. In one embodiment, two batteries may be present—a primary battery 262 and a secondary battery 264. The primary battery 262 may serve as the main power source for the wireless communications device. The secondary battery 264 may be smaller and provide less power duration than the primary battery 262. The secondary battery 264 may also be made of different material than the primary battery 262, thereby resulting in different capacity or charge life. In one embodiment, charging of both batteries occurs simultaneously any time the wireless communications device is being charged.

The primary battery 262 may be connected to an on/off button 266, with the on/off button 266 being responsible for sending an on/off signal 270 through a switch 268 to a processor 272, to power on and off the wireless communications device. When turned on, the primary battery 262 may be used to power normal operating functions of the wireless communications device.

In an alternative embodiment, the on/off button 266 may also function as an emergency communication hard key. In the event that the on/off button 266 also functions as the emergency communication hard key, a distinctive pattern or predefined sequence for depressing the on/off button 266 may be used to distinguish between a desire to power on or off the device or to send an emergency communications message. Other hard keys (not shown) on the wireless communications device may similarly perform multiple functions and may be used in place of the on/off button 266 as an emergency communication hard key.

The secondary battery 264 may be connected to an emergency communication hard key 274. The emergency communication hard key 274 may be a button with the sole function of initiating an emergency communication 278 or may be a multi-purpose button, as described previously. In one embodiment, when the emergency communication hard key 274 is activated, the secondary battery 264 may power the wireless communications device, in whole or in part, and send the emergency communication 278 through a switch and on to the processor 272. In another embodiment, the secondary battery 264 is limited to powering the wireless communications device when the wireless communications device is in the power-off mode. In other words, the primary battery 262 would continue to power the wireless communications device and would be responsible for sending the emergency communication if signaled to do so while the device is in the power-on mode.

In one embodiment, the emergency communication hard key 274 may be illuminated by a light source that illuminates the emergency communication hard key 274 with less light than other hard-keys. If keys on a wireless communications device are ordinarily lit by an LED and powered by the primary battery, when the wireless communications device is powered off, none of the keys would ordinarily be lit. In one embodiment, the emergency communication hard key 274 may be lit separately, whether powered on or powered off with an LED light that releases less light than the other keys. Alternatively, illumination may be provided with the same or more light than normally provided for other keys. It is important to note that although not depicted in the figure, the illumination of the emergency communication hard key 274 may be provided by either the primary or the secondary battery.

Figure 3A:
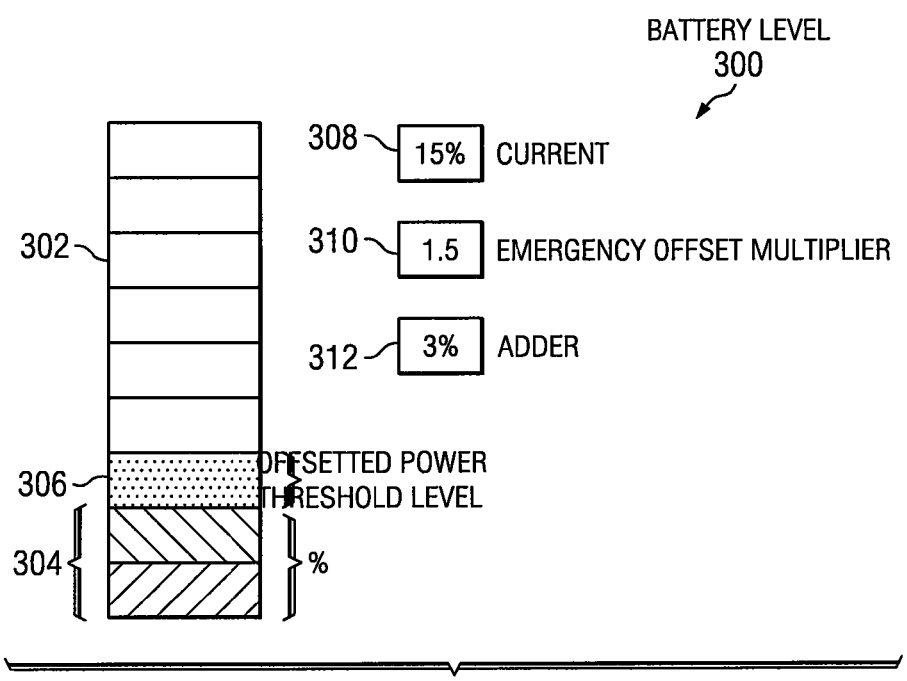
FIG. 3A is an illustration of an illustrative battery power meter along with relevant threshold levels used for determining battery shut-off.

FIG. 3A is an illustration 300 of an illustrative battery power meter 302 along with relevant threshold levels used for indicating battery power level to notify a user of battery shut-off. The battery power meter 302 may be visually depicted on a wireless communications device 102. A circuit or software program may measure and calculate power level for display on the battery power meter 302. For purposes of clarity, in addition to a power threshold level 304, the battery power meter 302 is being displayed to illustrate the concept of an offsetted power threshold level 306. The power threshold level 304, as described previously, is the point at which there is no longer enough charge to power the wireless communications device. The power threshold level 304 may be used for shutting down the wireless communications device 102 once the battery power crosses the power threshold level 304. In the configuration where there is only a single battery, the offsetted power threshold level 306 may be incorporated into the wireless communications device 102 to provide enough reserve battery power for powering up the wireless communications device and sending an emergency message communication. In other embodiments, whether there is a backup battery or not, the wireless device may still incorporate an offsetted power threshold level 306 to the primary battery for various other functions, such as reserving power for traditional communications other than emergencies.

If the power threshold level setting 308 is currently at 15%, the wireless communications device may be configured to power down the device with 15% of the battery level remaining. By definition, the power threshold level is the point at which there would no longer be enough available battery power to power the wireless communications device, including communicating an emergency message. A multiplier 310, such as 1.5, as described previously, may be selected for the offsetted power threshold level. Alternatively, an adder 312, such as 3% may be added to the power threshold level 308 for determining the offsetted power threshold level. Although described as using the power threshold level, a voltage threshold level or current threshold level may equivalently be utilized to manage battery shutoff and offset levels.

Figure 3B:
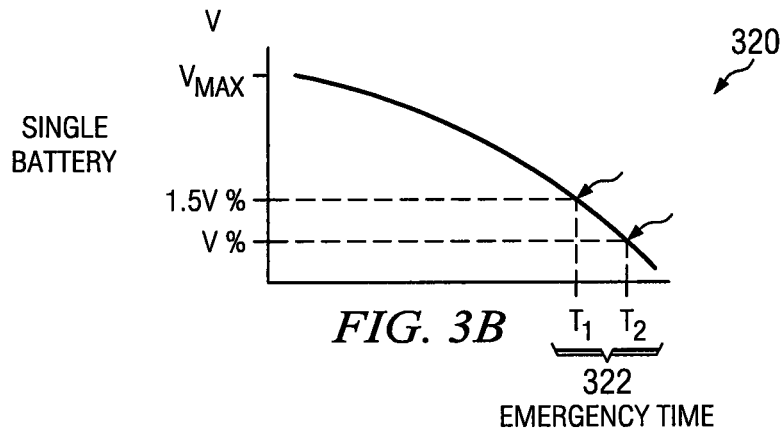
FIG. 3B is a graph of an illustrative voltage versus time curve for a wireless communications device with a single battery.

FIG. 3B is a graph of an illustrative voltage versus time curve 300 for a wireless communications device with a single battery. The curve illustrates that the voltage (V) of the wireless communication graph declines over time, starting at a max voltage (Vmax) for the battery. At time $T_1$, a first threshold (1.5V %) is crossed. If an emergency communication offset is in place for the wireless communications device, at time $T_1$, the device may be automatically powered down. Time $T_2$ represents the lowest voltage at which the device may operate. The time interval between time $T_1$ and time $T_2$ may be considered the emergency time interval 322 that is reserved for an emergency communication. As described previously, the emergency time interval 322 may be overridden by a user, however, the ability to communicate an emergency message may be compromised until the battery is recharged.

Figure 3C:
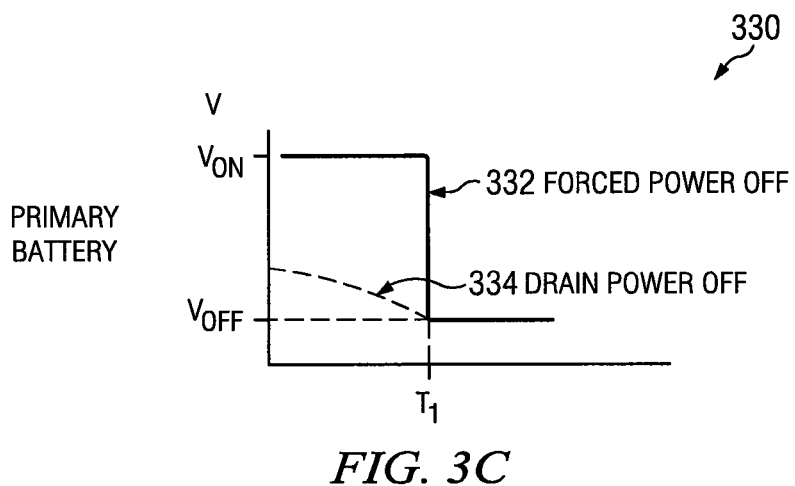
FIG. 3C is a diagram of an illustrative voltage versus time curve for a primary battery from an embodiment with a primary and a secondary battery.

FIG. 3C is a diagram of an illustrative voltage versus time curve 330 for a primary battery from an embodiment with a primary and a secondary battery. A forced power off 332 is depicted at time $T_1$. For a forced power off 332, the voltage level (V) drops immediately from $V_{on}$ to $V_{off}$. A second curve, drain power off 334, is also depicted. The drain power off 334 curve represents a battery's natural discharge over time. At time $T_1$, the voltage for the battery reaches $V_{off}$ with a similar result as the forced power off 332.

Figure 3D:
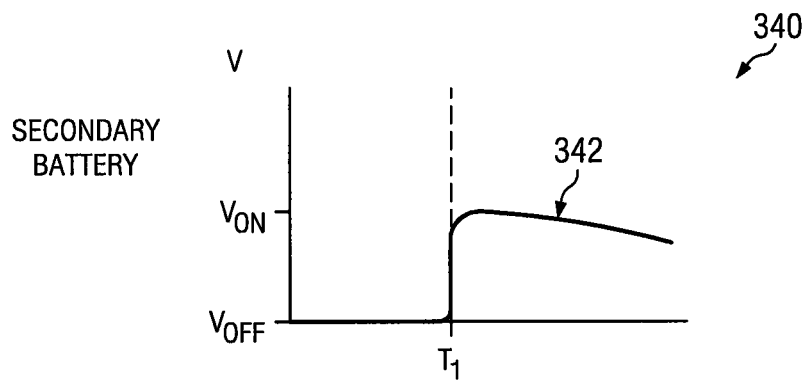
FIG. 3D is a diagram of an illustrative voltage versus time curve for a secondary battery from an embodiment with both a primary and secondary battery.

FIG. 3D is a diagram of an illustrative voltage versus time curve for a secondary battery from an embodiment with both a primary and secondary battery. At time $T_1$, the same time as the $V_{off}$ in FIG. 3C, the power curve 342 for the secondary battery switches from the $V_{off}$ level to the $V_{on}$ level, and may serve as a backup power supply to a device. Similar to the drain power off 334 curve in FIG. 3C, The power curve 342 also depicts the battery's natural discharge over time. The secondary battery may be used solely for an emergency backup in the even that the primary battery is drained, however in other embodiments, the secondary battery may also be used any time an emergency communications is needed and the primary battery is powered down.

Figure 4:
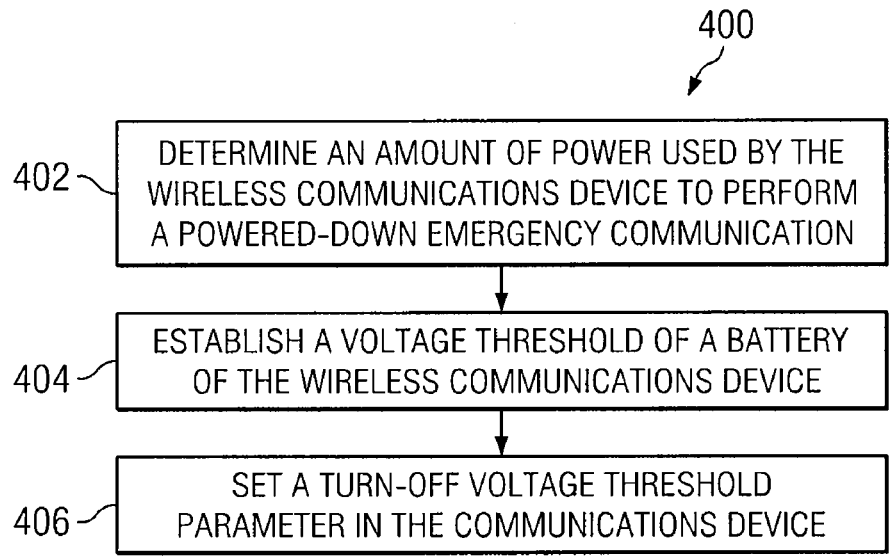
FIG. 4 is a flow chart of one embodiment of a process for establishing a voltage threshold at which to turn off electronics of a wireless communications device for emergency message power preservation.

FIG. 4 is a flow chart of one embodiment of a process 400 for establishing a voltage threshold at which to turn off electronics of a wireless communications device for emergency message power preservation. At step 402, an amount of power used by the wireless communications device to perform a powered-down emergency communication may be determined. The determination of the amount of power used to perform a powered-down emergency communication may include determining the amount of power used to perform an emergency power-up sequence, connecting with the communications network, communicate a pre-established message to the communications network, and provide a notification that the message was communicated to a user of the wireless communications device. An emergency power-up sequence may be an abbreviated power-up sequence that powers up nimal components or performs minimal software startup to be energy efficient and fast start-up. The powered-down emergency communication may be used when power to the wireless communications device is off and a user initiates an emergency message request. A pre-established message may be stored locally in the wireless communications device. A user may also have the ability to change, select, or add the pre-established message. The pre-established message may not be alterable in other embodiments. The notification that a message was communicated to the user may be a visual indication, such as a flash of a light, an audio indication, such as a beep, or any number of indications that allow a user to know that the message was communicated. Certain emergencies may call for more discretion in the notification, such as a person hiding from a burglar who may not want any noise to be emitted, therefore the notification may be selected by the user in advance or at the time of the request.

In step 404, a voltage threshold of a battery of the wireless communications device may be established that, when measured, causes the electronics to turn off so as to ensure that the wireless communications device has sufficient power to perform at least one powered-down emergency communication if activated by a user. Using information obtained in step 402, the voltage threshold of the battery may be established in step 404. The voltage threshold may also allow for any number of powered-down emergency communications. The number may be established by default or by a user of the device.

In step 406, a turn-off voltage threshold parameter may be set in the wireless communications device based on the established voltage threshold that causes the wireless communications device to turn off at a certain battery voltage level to ensure sufficient battery power remains to perform at least one powered-down emergency communication. The established voltage threshold may be set as a parameter within the communications device, with the ability to adjust or eliminate the turn-off voltage threshold parameter made possible by the wireless communications device.

Figure 5:
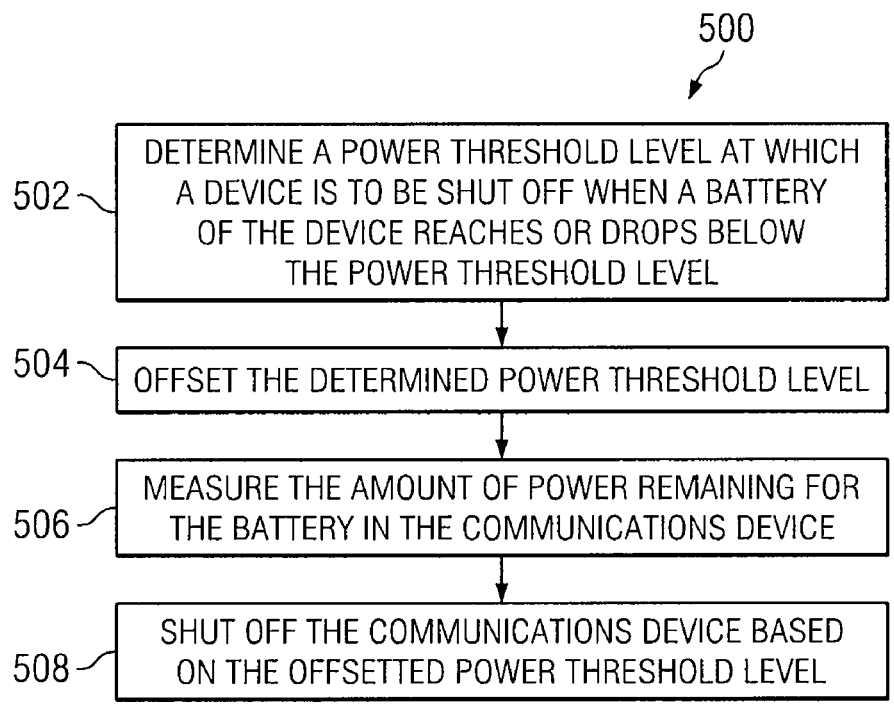
FIG. 5 is a flow chart of an embodiment of a process for establishing a power threshold at which to turn off electronics of a wireless communications device.

FIG. 5 is a flow chart of an embodiment of a process 500 for establishing a power threshold at which to turn off electronics of a wireless communications device. At step 502, a power threshold level at which a device is to be shut off when a battery of the device reaches or drops below the power threshold level may be determined. The power threshold level may be determined based on emergency power-up sequence calculations as described above. The power threshold level may be altered over time as the battery wears out over time. At step 504, the determined power threshold level may be offset. The offset may be detertiuned based on the amount of power necessary to communicate at least one emergency communication, as described previously. An ability to offset power for multiple emergency communication messages or other communication may also be factored into the offset. The offset may be set by a user, by a manufacturer, or in any number of other ways. Additionally, the offset may be configured to be overridden in the event a user chooses to deplete emergency reserve power. At step 506, the amount of power remaining for the battery in the communications device may be measured. The current battery power remaining may be measured and used for calculations to determine an appropriate time to shut off the device. At step 508, based on the offset power threshold level, the communication device may be shut off. Using the measured amount of power from step 506 as well as the determined power threshold level from step 504, the device may be shut off at the correct power threshold, taking into account any established offset.

Figure 6A:
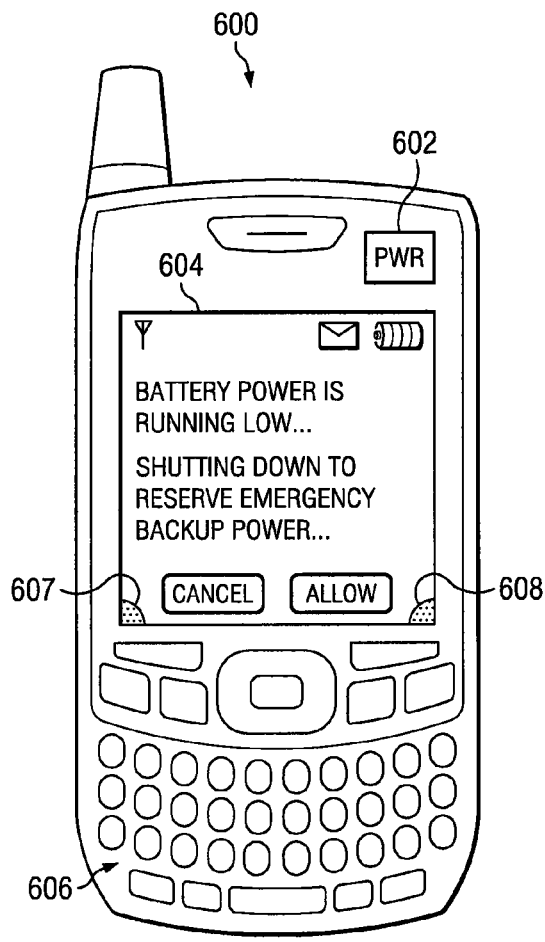
FIG. 6A is an illustration of a screen shot displayed in one embodiment when battery power reaches a threshold.

FIG. 6A is an illustration of a screen shot 600 displayed on a wireless communications device in one embodiment when battery power reaches a power threshold level while the device is in a power-on mode. In one embodiment, the wireless communications device may include a hard-key power button 602 configured to signal the device to be powered on or powered off, a display screen 604 for displaying text and other data to a user, and a keyboard 606 for providing input into the wireless communications device. The screen shot 600 depicts a warning message "Battery power is running low . . . shutting down to reserve emergency backup power . . . ." A user of the wireless communications device may choose to override automatic shutdown by selecting a cancel button 607. The cancel button 607 may be a soft-key, in the event the wireless communications device is touch screen enabled Alternatively or in addition, the cancel button 607 may be a hard-key located on the wireless communications device. Automatically shutting down the device may be a default selection occurring without user intervention. The user may also select an allow button 608 to immediately shut down the wireless communication device.

Figure 6B:
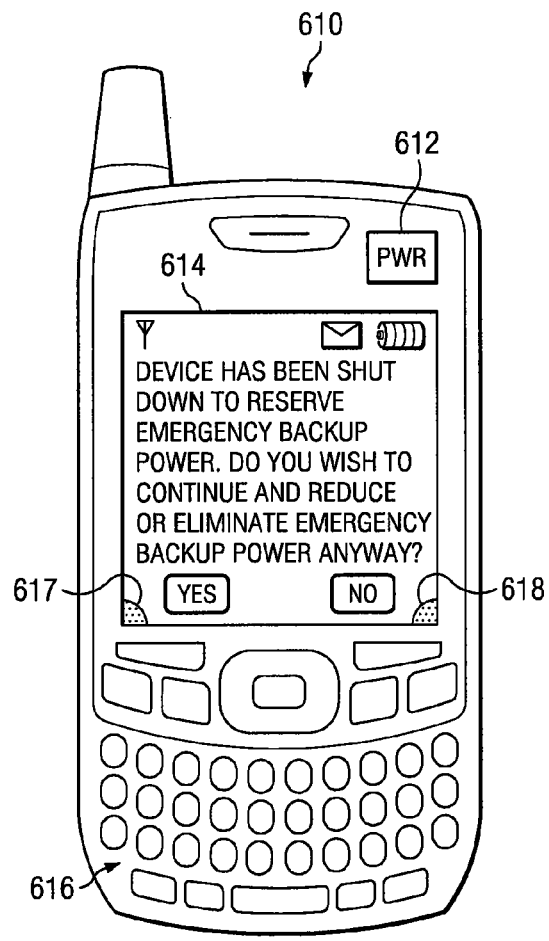
FIG. 6B is an illustration of a screen shot displayed in one embodiment when a user attempts to power on a device that has been previously powered down to reserve emergency backup power.

FIG. 6B is an illustration of a screen shot 610 displayed in one embodiment when a user attempts to power on a device that has been previously powered down to reserve emergency backup power. In one embodiment, the wireless communications device may include a hard-key power button 612 configured to signal die device to be powered on or powered off, a display screen 614 for displaying text and other data to a user, and a keyboard 616 for providing input into the wireless communications device. The screen shot 610 depicts a warning message "Device has been shut down to reserve emergency backup power. Do you wish to continue, and reduce or eliminate emergency backup power anyway?" A user of the wireless communications device may choose to power on the device by selecting a YES button 617. The YES button 617 may be a soft-key, in the case where the wireless communications device is touch screen enabled, or a hard-key located on the wireless communications device.

Figure 6C:
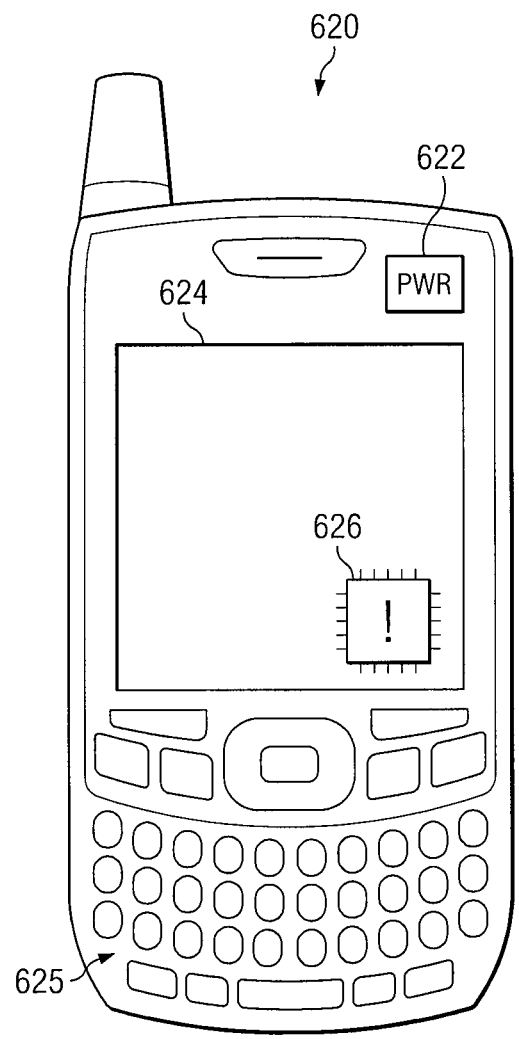
FIG. 6C is an illustration of a screen shot displayed in one embodiment depicting a portion of a display screen being powered by backup power.

FIG. 6C is an illustration of a screen shot 620 displayed in one embodiment depicting a portion of a display screen being powered by backup power. In one embodiment, the wireless communications device may include a hard-key power button 622 configured to signal the device to be powered on or powered off, a display screen 624 for displaying text and other data to a user, a keyboard 625 for providing input into the wireless communications device, and a soft-button 626 for initiating an emergency communication message. The screen shot 620 depicts the soft-button 626, which may appear on the display screen 624 that is only partially powered. The display screen may be segmented into sections with each section being able to be independently powered by a power source, such as a primary or secondary battery. Having the display screen only partially powered allows for the wireless communications device to retain the soft button 626 feature while conserving battery power.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will rmmediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A wireless communications device comprising:
   a display screen;
   an electronics system configured to provide communications over a communications network;
   a primary battery configured to power the electronics during a power-on mode; a secondary battery configured to power the electronics in response to an emergency signal being received while said electronics are in a power-off mode;
   wherein the electronics system:
      establishes a voltage threshold of the primary battery to ensure that the wireless communications device, at the voltage threshold, has sufficient power for an emergency communication;
      establishes an offsetted power threshold that is a multiplier of the voltage threshold;
      displays, on the display, a battery power meter that indicates both the voltage threshold and the offsetted power threshold;
      generates a pre-established emergency message in response to the emergency signal, wherein the pre-established emergency message is directed to an emergency service provider associated with the emergency signal, and wherein the secondary battery powers only a portion of the display screen while said electronics are in power-off mode, with a second portion of the display screen remaining unpowered, such that the display screen is only partially powered to allow the display screen to retain some functionality while conserving power of the secondary battery.

2. The wireless communications device according to claim 1, further comprising:
a hard-key configured to automatically generate the emergency signal in response to a user activation, wherein the pre-established emergency message is sent to an emergency service provider associated with the hard-key and is not a call.

3. The wireless communications device according to claim 2, wherein said hard-key is powered by said secondary battery.

4. The wireless communications device according to claim 2, wherein said hard-key has a light source that illuminates the hard-key with less light than other hard-keys.

5. The wireless communications device according to claim 2, wherein the emergency signal is identified by pulses generated in response to a user pressing said hard-key in a pre-defined sequence.

6. The wireless communications device according to claim 1, wherein the secondary battery is limited to powering said electronics to only when the emergency signal is received while said electronics are in the power-off mode.

7. A method for establishing a voltage threshold at which to turn off electronics of a wireless communications device so as to preserve enough power to communicate an emergency message over a communications network, the method comprising:
determining an amount of power used by the wireless communications device to perform a powered-down emergency communication, including performing an emergency power-up sequence, powering only a portion of a display screen of the wireless communication device while a second portion of the display screen remains unpowered, connecting with the communications network, communicating a pre-established message to the communications network in response to selection by a user of a dedicated button of the wireless communications device, and providing a notification that the message was communicated to the user of the wireless communications device; and
establishing a voltage threshold level of a battery of the wireless communications device that, when measured, causes the electronics to turn off so as to ensure that the wireless communications device has sufficient power to power only the portion of the display screen while the second portion of the display screen remains unpowered and communicate the pre-established message to an emergency service provider associated with the selection;
setting a turn-off voltage threshold parameter in the wireless communications device based on an offsetted power threshold level, the offsetted power threshold level based on a multiplier of the voltage threshold, the turn-off voltage threshold parameter causing the wireless communications device to turn off at a certain battery voltage level to ensure sufficient battery power remains to perform at least one powered-down emergency communication; and
displaying, on a battery power meter, both the voltage threshold level and the offsetted power threshold level.

8. The method according to claim 7, further comprising storing an offset value in a memory location of the communications device.

9. The method according to claim 7, further comprising providing a user a selectable option to turn on and off offsetting of the power threshold level.

10. The method according to claim 7, further comprising in response to receiving an emergency message request, while the wireless communications device is powered-down, utilizing at least a portion of the remaining power in the battery to communicate the pre-established emergency message.

11. The method according to claim 10, further comprising in response to a user attempting to turn on the wireless communications device, after being powered-down, displaying a message notifying the user that emergency message capabilities will be reduced or lost if power-up continues and enables the user to select whether to continue with power-up.

12. The method according to claim 10, wherein communicating the emergency message includes communicating a text message.

* * * * *